United States Patent Office.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

BLUE TETRAZO DYE.

SPECIFICATION forming part of Letters Patent No. 516,757, dated March 20, 1894.

Application filed December 19, 1893. Serial No. 494,079. (Specimens.) Patented in France April 17, 1893, No. 229,422, and in England June 28, 1893, No. 12,704.

*To all whom it may concern:*

Be it known that I, JOHANN JAKOB BRACK, a citizen of the Swiss Republic, residing at Basle, Switzerland, have invented new and useful Improvements in the Production of Tetrazo Coloring-Matters, (partly patented by the firm L. Durand, Huguenin & Co., of St. Fons, near Lyons, France, Basle Switzerland, and Hüningen, Germany, in France by Letters Patent No. 229,422, dated April 17, 1893, and in England by Letters Patent dated June 28, 1893, No. 12,704;) and I do hereby declare the following to be a full, clear, and exact description of the invention.

This invention relates to the manufacture of new coloring matters, dyeing unmordanted cotton in an alkaline bath a blue tint, the said coloring matters being obtained by combining a naphtolsulfo acid, with the tetrazo-derivative of the diamido-base resulting from the condensation of formaldehyde with dianisidin and the hydrochlorate of a monoamido-compound. By way of example, I will now describe the production of the blue coloring matters obtained with naphtolmo-nosulfonic acids and the diamido-bases derived from formaldehyde, dianisidin and anilin or orthoamidophenol.

I. *Production of the dye by combining alpha-naphtol-alpha-monosulfonic acid with the tetrazo-compound of the diamido-base derived from formaldehyde, dianisidin and hydrochlorate of anilin.*—3.5 kilos of the diamido-base obtained by the reaction of one molecule of formaldehyde on one molecule of dianisidin and one molecule of anilin-hydrochlorate are diazotized by eight kilos of hydrochloric acid of 21° Baumé and 1.4 kilos of sodium nitrite. The tetrazo-compound thus obtained is poured into a solution of 4.5 kilos of alpha-naphtol-alpha-sulfonic acid and six kilos of carbonate of soda. After standing for several hours, the mixture is boiled and the dye obtained is salted out. When dried it forms a brown powder possessing a metallic luster, and dies unmordanted cotton blue in an alkaline bath. The solution in concentrated sulfuric acid is gray blue. The coloring matter produced is readily soluble in water but only slightly soluble in alcohol.

II. *Production of the dye by combining alpha-naphtol-alpha-monosulfonic acid with the tetrazo-compound of the diamido-base derived from formaldehyde, dianisidin and hydrochlorate of orthoamidophenol.*—The tetrazo-derivative obtained with 1.4 kilos of sodium nitrite, eight kilos of hydrochloric acid at 21° Baumé and 3.6 kilos of the unsymmetric diamido-base resulting from the condensation of formic-aldehyde with dianisidin and orthoamidophenol, is poured into a solution of 4.5 kilos of alpha-naphtol-alpha-sulfonic acid and six kilos of carbonate of soda. After leaving the mass to itself for several hours the coloring matter is precipitated by the addition of sea salt. When dried it appears as a brown powder with a metallic luster. In an alkaline bath it dies unmordanted cotton a blue tint. The solution of the coloring matter in concentrated sulfuric acid is green blue. The coloring matter produced is readily soluble in water but only slightly soluble in alcohol.

The alpha-naphtol-alpha-sulfonic acid or naphtol-monosulfo-acid (1.4) employed in the preceding examples may be replaced by the same quantity of another naphtolmono-sulfo-acid, for example, by the naphtolmono-sulfo-acid (1.5). If in the first example above specified the naphtolmonosulfo-acid (1.4) be replaced by the same quantity of naphtol-monosulfo-acid (1.5) there is obtained a substantive cotton dye, which dyes unmordanted cotton in an alkaline bath a greenish blue tint and forms a brown powder with a metallic luster, which dissolves in concentrated sulfuric acid with a blue gray color.

What I claim as my invention, and wish to secure by Letters Patent, is—

1. The herein described process for the manufacture of tetrazo-coloring matters which consists in combining two molecules of a naphtolsulfo-acid with one molecule of the tetrazo-derivative of the unsymmetrical diamido-base resulting from the condensation of equivalent quantities of formaldehyde, dianisidin and the hydrochlorate of a monoamido-compound, as set forth.

2. The herein described process for the manufacture of a blue tetrazo-coloring matter, which consists in combining two molecules of a naphtolmonosulfo-acid with one molecule of the tetrazo-derivative of the unsymmetrical diamido-base resulting from the reaction of equivalent quantities of formaldehyde, dianisidin and hydrochlorate of anilin or ortho-amidophenol, as set forth.

3. As a new article of manufacture, the herein described tetrazo-coloring matter derived from an unsymmetrical diamido-base which dyes unmordanted cotton a blue tint, which in its dry state is n the form of a brown powder possessing a metallic luster which dissolves in concentrated sulfuric acid with a blue color, is soluble in water and only slightly soluble in alcohol, as set forth.

In witness whereof I have hereunto signed my name in the presence of two subscribing witnesses.

JOHANN JAKOB BRACK.

Witnesses:
THEODORE STACHELIN,
GEORGE GIFFORD.